May 27, 1969
JAMES E. WEBB
ADMINISTRATOR OF THE NATIONAL AERONAUTICS
AND SPACE ADMINISTRATION
BUS VOLTAGE COMPENSATION CIRCUIT FOR
CONTROLLING DIRECT CURRENT MOTOR
Filed Dec. 27, 1966
3,446,992
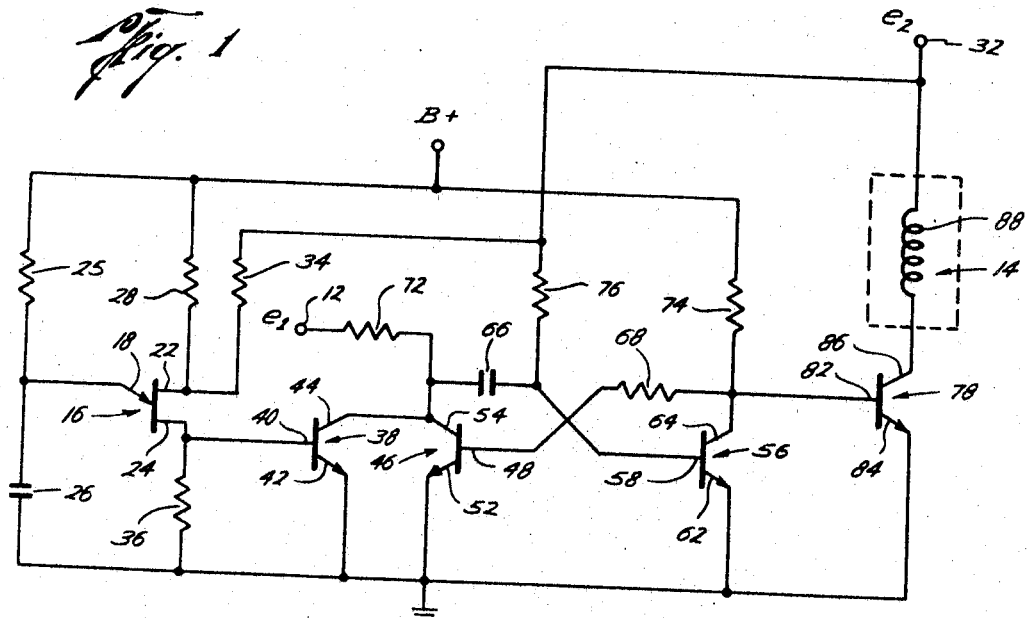
Fig. 1
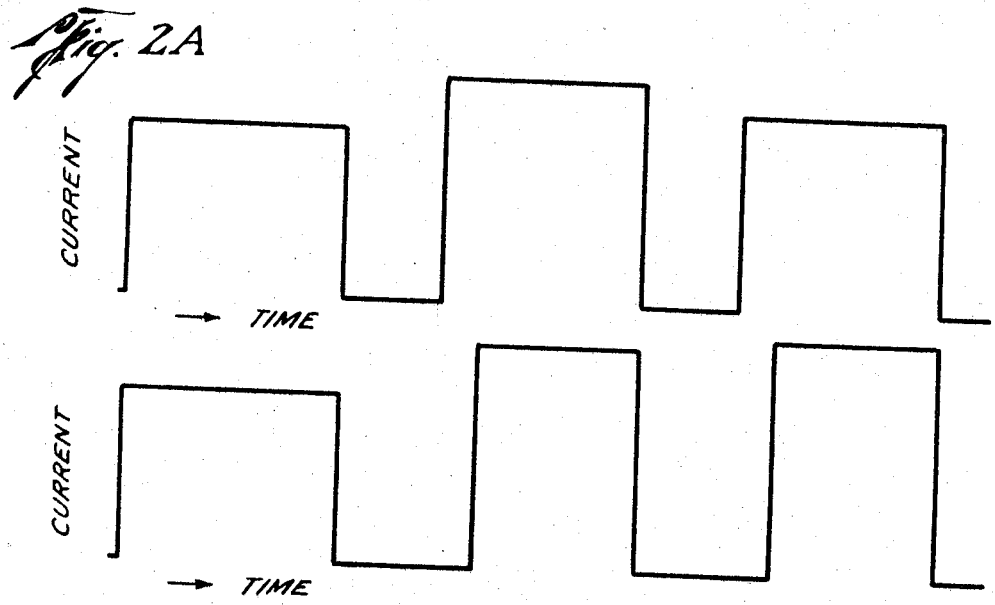
Fig. 2A
Fig. 2B
Walter A. Barniskis
John W. Fink
INVENTORS
BY
ATTORNEYS

United States Patent Office 3,446,992
Patented May 27, 1969

3,446,992
BUS VOLTAGE COMPENSATION CIRCUIT FOR CONTROLLING DIRECT CURRENT MOTOR
James E. Webb, Administrator of the National Aeronautics and Space Administration with respect to an invention of Walter A. Barniskis and John W. Fink, both of Minneapolis, Minn.
Filed Dec. 27, 1966, Ser. No. 605,102
Int. Cl. H03k 1/16, 5/159
U.S. Cl. 307—265                                3 Claims

ABSTRACT OF THE DISCLOSURE

A control circuit for automatically compensating for fluctuations in voltage supply to a D.C. motor for which the on-time is made to vary with an input signal. The control circuit comprises a relaxation oscillator formed of a unijunction transistor, the output pulses of which are fed through an isolation transistor to a monostable multivibrator which controls a switching transistor in series with the motor winding and motor voltage source. The oscillator output pulses control the frequency of periods during which current flows through the motor winding and a source of input signals also fed to the monostable multivibrator varies the period during which current flows through the winding. To compensate for variations in the motor winding voltage, a feedback circuit is coupled from the motor voltage source to the unijunction transistor and the motor voltage source is connected to the multivibrator at the input signal terminal. If the motor voltage source varies, the frequency and duration of the operational period of the motor winding is varied to maintain a constant motor current-time characteristic.

---

The invention described herein was made in the performance of work under a NASA contract and is subject to the provisions of Section 305 of the National Aeronautics and Space Act of 1958, Public Law 85–568 (72 Stat. 435; 52 U.S.C. 4257).

This invention relates in general to control circuits and more particularly, to a bus voltage compensation circuit for providing a constant current-time characteristic through a load.

In motor control circuits, the on-time of the motor may be made to vary with an input signal, thus producing a current-time characteristic which is directly related to the input signal, the current-time characteristic being the relationship of quantity of current supplied to the motor winding relative to a time period. However, fluctuations of the bus voltage would alter the motor current-time characteristics causing them to be a function not only of the input signal, but also of the bus voltage. While bus voltage regulator circuits for extremely accurate voltage regulation are well known, such circuits are usually complex.

In order to provide a constant current-time output characteristic for a D.C. motor winding in accordance with an input signal, the present invention automatically corrects for bus voltage variations while simultaneously eliminating the need for prior art regulation circuits. A constant current-time characteristic is herein considered a current-time characteristic which is unaltered by fluctuations in the motor voltage supply. The invention utilizes the varying bus voltage in a novel feedback arrangement so that fluctuations of the bus voltage are automatically compensated for to provide the desired current-time output characteristic at the motor winding.

More particularly, the invention comprises a D.C. motor having a winding whose current-time characteristic is varied by a control circuit. The circuit comprises a relaxation oscillator formed of a unijunction transistor. The output pulses of the oscillator control the frequency of the periods during which the current flows through the motor winding. Output pulses from the oscillator are fed through an isolation transistor to a monostable multivibrator. Also fed to the monostable multivibrator is a source of input signals which varies the period during which current flows through the motor winding. The output of the multivibrator is fed to a switching transistor. In order to compensate for variations in the motor winding voltage, a feedback circuit is coupled from the motor voltage source to the unijunction transistor. Further, the motor voltage source is connected to the multivibrator at the input signal terminal. As the motor voltage source varies, the frequency and duration of the operational period of the motor winding is varied. The resultant output at the motor winding is a constant current-time characteristic.

The advantage of this invention, both as to its construction and mode of operation, will be readily appreciated as the same become better understood by reference to the following detailed description when considered in connection with the accompanying drawing wherein:

FIG. 1 is a circuit of the novel motor control circuit; and

FIGS. 2a and 2b are graphical displays of the current-time characteristics of the circuit of FIG. 1.

Referring now to FIG. 1, there is shown the novel motor control circuit in accordance with this invention. Input signals are applied to an input terminal 12 to vary the current-time characteristics of a load such as a D.C. motor 14.

The circuit further comprises a relaxation oscillator comprising a unijunction transistor 16 having an emitter 18, a first base 22, and a second base 24. A charging circuit for the oscillator comprises a resistor 25 which is connected between a source of positive potential (B+) and the emitter 18, and a capacitor 26 which is connected between the emitter 18 and ground.

The first unijunction transistor base 22 is connected to both the source of positive reference potential through a resistor 28 and to a motor voltage source at terminal 32 through a resistor 34. The second unijunction transistor base 24 is connected through an output resistor 36 to ground. Output signals from the base 24 are coupled to an isolation transistor 38 at its base 40. The transistor 38 further comprises an emitter 42, which is connected to ground, and a collector 44.

Output signals from the transistor 38 are coupled to a monostable multivibrator comprising a first transistor 46 having a base 48, an emitter 52, and a collector 54, and a second transistor 56 having a base 58, an emitter 62, and a collector 64. The collector 54 of transistor 46 is connected to the collector 44 of the transistor 38, and also to the base 58 of transistor 56 through a capacitor 66. The emitter 52 of the transistor 46 is connected to ground, and the base 48 is connected through a resistor 68 to the collector 64 of transistor 56. Emitter 62 of transistor 56 is connected to ground. The input terminal 12 is connected through a resistor 72 to the junction of the capacitor 66 and the collector 54 of transistor 46. The collector 64 of transistor 56 is also connected through a biasing resistor 74 to the source of positive potential. Further, the base 58 of transistor 56 is connected through a resistor 76 to the terminal 32.

Output signals from the multivibrator are coupled from the collector 64 to a switching transistor 78 at its base 82. The transistor 78 further comprises an emitter 84 which is connected to ground, and a collector 86 which is connected through the motor winding 88 to the motor voltage terminal 32.

With the foregoing in mind, operation of the circuit of FIG. 1 with the compensating resistor 34 omitted from the circuit, and with the resistor 76 connected to the source of positive potential rather than the terminal 32 is as follows:

The capacitor 26 charges through the resistor 25 for a sufficient value until the unijunction transistor 16 becomes conductive, producing a positive pulse at the base 40 of transistor 38, causing the transistor 38 to conduct. With the transistor 38 conductive, the capacitor 66 discharges through the transistor 38 and causes transistor 56 to become non-conductive and transistor 46 to become conductive. With transistor 56 non-conductive, the voltage at its collector 64 starts to rise, causing transistor 78 to become conductive, allowing current to flow through the motor winding 88. Transistor 56 remains non-conductive and transistor 78 remains conductive in accordance with the signal applied to the terminal 12. The monostable multivibrator then returns to its stable state (the transistor 56 conductive and transistor 46 non-conductive), and current no longer flows through the motor winding 88 until the next pulse from the relaxation oscillator is applied to transistor 38. The current-time characteristic through the winding 88 is as depicted in FIG. 2a.

Should the voltage at the terminal 32 rise, of course, a greater current would flow through the motor winding 88 for a given period of time. Considering now the circuit of FIG. 1 with the resistor 34 in the circuit, and the resistor 76 connected to the terminal 32, as the voltage at terminal 32 starts to rise, the voltage at the base 22 of unijunction transistor 16 also starts to rise and capacitor 26 must charge for a longer time before the unijunction transistor becomes conductive. Thus, a greater voltage at terminal 32 will decrease the frequency of the pulses from the unijunction transistor and cause the on-time of the transistor 78 to decrease. Further, the rise in voltage at the terminal 32 causes the capacitor 66 to reach the turn-on voltage of transistor 56 faster, reducing the on-time of the transistor 78. The net effect of the increase of the voltage at terminal 32 is to decrease the frequency and pulse width of the motor current pulses. Thus, the current versus time characteristic remains constant, as can be seen by the curve of FIG. 2b.

It should be further appreciated that the circuit may be used to energize the winding of the motor in one direction and obtain rotation in one direction of the motor. A second channel similar to the one disclosed may be provided so as to receive opposite polarity signals at the terminal 12 so as to reverse the energized motor winding and thus cause opposite rotation thereof.

While the circuit has been described as controlling the current through a motor winding, it should be understood, of course, that the circuit could be utilized where a constant current-time characteristic is to be supplied periodically to a load from a varying voltage source.

It should be further understood that the foregoing disclosure relates only to preferred embodiments of the invention, and that it is intended to cover all changes and modifications of the examples of the invention herein chosen for the purpose of the disclosure which do not constitute departures from the spirit and scope of the invention.

What is claimed and desired to be secured by Letters Patent is:

1. A control circuit for providing a constant current-time characteristic through a load in accordance with an input signal comprising:
   an oscillator for producing output pulses whose frequency controls the periods during which current flows through said load, said oscillator comprising a unijunction transistor;
   switching means for controlling the duration of said periods, said oscillator output pulses and said input signal being coupled to said switching means;
   a source of D.C. voltage coupled to said load;
   means coupling said switching means to said load;
   means for coupling said D.C. voltage to said oscillator by connecting said D.C. voltage to a base of said unijunction transistor for varying the frequency of said periods in accordance with variations in said D.C. voltage;
   said switching means comprising a monostable multivibrator, said D.C. voltage being coupled to said monostable multivibrator for varying the current through said load in accordance with variations in said D.C. voltage.

2. A control circuit in accordance with claim 1 wherein said switching means further comprises an isolation transistor, said isolation transistor coupling said relaxation oscillator to said monostable multivibrator.

3. A control circuit in accordance with claim 2 and further comprising a switching transistor having a first stable state and a second stable state, said switching transistor being coupled between said monostable multivibrator and said load, said monostable multivibrator controlling said stable states of said switching transistor.

References Cited

UNITED STATES PATENTS

| | | | |
|---|---|---|---|
| 2,714,693 | 8/1955 | Van Eyk | 317—137 |
| 3,191,113 | 6/1965 | Gargani | 318—341 XR |
| 3,214,666 | 10/1065 | Clerc | 318—341 XR |
| 3,223,912 | 12/1965 | Sheheen | 318—341 |
| 3,358,206 | 12/1967 | Thiele | 318—341 |
| 3,378,745 | 4/1968 | James | 318—341 XR |

JOHN S. HEYMAN, *Primary Examiner.*

JOHN ZAZWORSKY, *Assistant Examiner.*

U.S. Cl. X.R.

307—271, 297; 318—18, 138, 341, 345; 331—111